US012654779B2

(12) United States Patent
Ryan

(10) Patent No.: US 12,654,779 B2
(45) Date of Patent: Jun. 16, 2026

(54) FRONT HOOD ASSEMBLY

(71) Applicant: SUBARU CORPORATION, Tokyo (JP)

(72) Inventor: Christopher Ryan, VanBuren Township, MI (US)

(73) Assignee: SUBARU CORPORATION, Tokyo (JP)

( * ) Notice: Subject to any disclaimer, the term of this patent is extended or adjusted under 35 U.S.C. 154(b) by 356 days.

(21) Appl. No.: 18/468,054

(22) Filed: Sep. 15, 2023

(65) Prior Publication Data

US 2025/0091656 A1 Mar. 20, 2025

(51) Int. Cl.
B62D 25/12 (2006.01)
B60R 9/06 (2006.01)
B60R 11/00 (2006.01)
E05F 15/611 (2015.01)

(52) U.S. Cl.
CPC .............. B62D 25/12 (2013.01); B60R 9/06 (2013.01); *B60R 2011/0038* (2013.01); *E05F 15/611* (2015.01); *E05Y 2900/536* (2013.01)

(58) Field of Classification Search
CPC ...... B62D 25/10; B62D 25/105; B62D 25/12; E05F 15/611; E05Y 2900/536
USPC ................... 296/37.1, 193.11; 224/311–331
See application file for complete search history.

(56) References Cited

U.S. PATENT DOCUMENTS

| | | | | | |
|---|---|---|---|---|---|
| 3,473,680 | A | * | 10/1969 | Downer ................. | B60R 11/06 |
| | | | | | 224/927 |
| 4,136,904 | A | * | 1/1979 | Lauderdale ............ | B60R 11/06 |
| | | | | | 224/540 |
| 4,227,737 | A | * | 10/1980 | Vogt ........................ | B60R 11/06 |
| | | | | | 296/76 |
| 4,305,695 | A | * | 12/1981 | Zachrich .................. | B60P 1/00 |
| | | | | | 414/522 |
| 4,416,483 | A | * | 11/1983 | Koch ....................... | B60R 11/06 |
| | | | | | 224/311 |
| 4,832,242 | A | * | 5/1989 | Leek ....................... | B60R 11/00 |
| | | | | | 224/539 |
| 4,941,718 | A | * | 7/1990 | Alexander, III ...... | G01S 13/931 |
| | | | | | 296/37.7 |
| 5,310,103 | A | * | 5/1994 | Weber ..................... | B60R 11/06 |
| | | | | | 224/311 |
| 5,372,289 | A | * | 12/1994 | Dachicourt ............... | B60R 7/02 |
| | | | | | 224/538 |
| 5,718,019 | A | * | 2/1998 | Cheal ..................... | E05D 11/00 |
| | | | | | 16/388 |
| 5,829,813 | A | * | 11/1998 | LaValle .................... | B60R 7/04 |
| | | | | | 224/311 |
| 5,992,718 | A | * | 11/1999 | Zaranek .................. | B60R 11/00 |
| | | | | | 224/547 |
| 6,641,013 | B2 | * | 11/2003 | Dise .......................... | B60R 9/00 |
| | | | | | 83/928 |
| 6,953,220 | B2 | * | 10/2005 | Takehara ............. | B62D 25/105 |
| | | | | | 296/193.11 |
| D552,533 | S | * | 10/2007 | Cord ........................... | D12/422 |
| 7,494,171 | B2 | * | 2/2009 | Martin ..................... | B60R 9/00 |
| | | | | | 224/403 |

(Continued)

*Primary Examiner* — Gregory A Blankenship
(74) *Attorney, Agent, or Firm* — Rimon P.C.

(57) ABSTRACT

Aspects of the subject technology relate to a hood assembly for a vehicle. The hood assembly includes a hood and a storage member attached to a lower surface of the hood. The hood assembly is configured for storage of one or more items in or on the storage member.

14 Claims, 7 Drawing Sheets

(56)        References Cited

U.S. PATENT DOCUMENTS

| | | | |
|---|---|---|---|
| 8,444,198 B2 * | 5/2013 | Pauken | B60R 7/02 |
| | | | 224/311 |
| 10,668,870 B2 * | 6/2020 | Furniss | B60R 11/06 |
| 11,643,024 B1 * | 5/2023 | Wells | B60R 11/06 |
| | | | 211/119.004 |
| 2008/0231066 A1 * | 9/2008 | Harrell | B60R 9/00 |
| | | | 296/37.6 |
| 2009/0045645 A1 * | 2/2009 | Bohlke | B60R 7/02 |
| | | | 296/37.5 |
| 2010/0019009 A1 * | 1/2010 | Stephens | B60R 7/00 |
| | | | 224/539 |
| 2016/0090769 A1 * | 3/2016 | Krajenke | E05F 1/1276 |
| | | | 296/193.11 |
| 2018/0056880 A1 * | 3/2018 | Gage | B60R 5/045 |
| 2019/0039659 A1 * | 2/2019 | Glickman | B60R 5/02 |
| 2020/0031401 A1 * | 1/2020 | Salter | B60Q 3/30 |
| 2022/0242086 A1 * | 8/2022 | Foran | B32B 3/12 |
| 2023/0192001 A1 * | 6/2023 | Mellergård | B60R 5/00 |
| | | | 296/37.1 |
| 2023/0234512 A1 * | 7/2023 | Kukla | B60R 5/02 |
| 2023/0391268 A1 * | 12/2023 | Harmon | B60R 19/52 |
| 2023/0398938 A1 * | 12/2023 | Koch | B62D 25/087 |
| 2025/0091656 A1 * | 3/2025 | Ryan | B60R 5/02 |
| 2025/0115188 A1 * | 4/2025 | Maeda | B62D 25/087 |
| 2025/0115189 A1 * | 4/2025 | Maeda | B60R 7/00 |
| 2025/0153677 A1 * | 5/2025 | Maeda | B62D 25/081 |
| 2025/0303969 A1 * | 10/2025 | Maeda | B62D 25/12 |

* cited by examiner

FRONT HOOD ASSEMBLY

FIELD OF INVENTION

The present disclosure relates to front hood assemblies for vehicles.

BACKGROUND ART

A trunk is an enclosed storage compartment usually located at the rear or the front of a vehicle. The trunk is covered by a hood or a bonnet while the vehicle is being driven or is not in use, and is accessed by opening or lifting the hood. It can provide a secure and separate storage area for luggage, tools, daily goods, and other items. Therefore, the trunk space is an important consideration for car users who transport such items frequently or who need ample storage capacity.

Electric vehicles (EV) have freed up this space, which had been occupied by a conventional internal combustion engine. Such spaces are typically located in the front (a "frunk"), or in some cases in the rear of a vehicle, can be utilized as additional storage.

The availability of such trunk spaces offers more, more convenient, and practical storage options.

SUMMARY OF THE INVENTION

One general aspect of the present disclosure includes a hood assembly for a vehicle, the hood assembly including a hood and a storage member attached to a lower surface of the hood (inner surface or underside of the hood), the hood assembly configured for storage of one or more items in or on the storage member.

Another general aspect of the present disclosure includes a vehicle or a car including a hood assembly including a hood and a storage member attached to a lower or inner surface of the hood, and configured to store one or more items in or on the storage member.

For example, items that are not frequently used but are important, or that should be used in an emergency, can be stored right at the underside of the hood. This allows the trunk space to be available for items that are frequently used or need to be quickly put in the trunk or taken out of the trunk. For example, an ice scraper is not frequently used, but it is needed, for example, on a freezing winter day. Thus, an ice scraper should not be stored inside the trunk space all the time, but rather should be stored in a space under the hood. As another example, a jack is needed only in an emergency and can be stored right under the hood, which frees the trunk space to be efficiently used for daily uses.

Hood

In some embodiments, the hood may be the front hood of a vehicle. In some embodiments, the hood may be the rear hood of a vehicle. In the present Application, the term "front hood" is often used. However, it should be understood that the features described in relation to a "front hood" may be applied to a "rear hood" as well. Thus, the present Application also provides "rear hood assemblies" having one or more similar features as described in relation to a "front hood assembly".

Storage Member

The storage member may be attached to a lower or inner surface of the hood. As used herein, the expressions "lower surface", "inner surface", "lower side", "inner side", and "underside" with respect to a hood are interchangeably used. The storage member may also be referred to as "under-hood storage" or "under-hood storage member". The term "lower", "inner" or "underside" when applied to the hood as used herein refers to a side that is not visible from the outside of the vehicle when the vehicle is in use or is being driven. In general, the "lower" or "inner" side or "underside" of the hood is the side that is located lower in the direction of gravity with respect to the hood. However, this should not be strictly understood in a limiting manner, and it should be understood that there may be other configurations.

In some embodiments, the item to be stored in or by the storage member may be predetermined. The storage member may be designed or be configured to hold one or more specific items. The storage member may be customized so as to be adapted to the choices of the user. In some embodiments, the item to be stored in or on the storage member may not be predetermined. The driver or a user may store any item in the storage member.

In some embodiments, the storage member is configured such that the items stored therein can be taken by the user. The storage member may have multiple sections or have partitions so as to have multiple sections. The storage member may have item holders. The storage may have one or more drawers, boxes, or have both.

The items may be tools related to the vehicle. Examples of such items include, but are not limited to, a tow hook, a screwdriver, a wheel lock, a wheel lock extension, a jack, a jack handle, a safety blanket, a rope, a ratchet strap, a road hazard kit, an ice scraper, a brush, a vacuum cleaner, a car washing set, a pet care kit, and the like.

Embodiment 1: Storage Member Fixed to Hood

In some embodiments, the items may be held directly at the lower surface of the hood. In some embodiments, the storage member may be fixed to the hood. In some embodiments, the storage member may include an item holder fixed to the hood. There may be one or more item holders.

The storage member may be fixed or attached to the hood. The storage member may be fixed or attached to the hood by one or more fasteners or threaded fasteners. For example, bolts may be used. The storage member may be tightly attached to the hood so as not to fall or move when the vehicle is in use, such as during driving.

The storage member may be formed in part or in whole by using one or multiple components or materials. Examples of the materials for the storage member include, but are not limited to, polypropylene (PP), aluminum, steel, glass-fiber-reinforced polymer (PP-GF, e.g., PP-GF30), talc-filled polypropylene (PP-TD, e.g., PP-TD15), and carbon fibers. In an example, aluminum may be used for the lid (cover) and the frame, and PP or ABS may be used for the drawers. PS, PP, or PS/PP molded parts may be used for the case of the storage member or for a separator inside the storage member. Such parts may allow the user to organize the arrangement of items inside the storage member. Such parts may hold items so that the items do not move due to vibration.

In some examples, the storage member may have an attachment to hold items. The attachment may be made of a molded polymer, an example of which is molded polypropylene (PP). In some examples, the storage member may have clips to hold items. The clip may be installed or affixed to the lower surface of the hood. The clip may be made of a polymer, examples of which include polyacetal or polyoxymethylene (POM). In some embodiments, such an attachment may be a tool bracket to hold items such as tools.

Examples of mechanisms to hold the items include, but are not limited to, a bolt-on hook or clamp or a screw-on hook or clamp, or a combination of the two. In some embodiments, hooks, clamps, or both, with a plastic attachment mechanism can be inserted into holes underneath the hood. For example, an ice scraper may be held by hooks, clamps or both. For example, ropes, cords, nets, etc., may be held by hooks, clips or both. Such hooks, clamps, and clips may be according to common standards or be created or be customized by the user or the manufacturer of the vehicle or the hood.

Embodiment 2: Storage Member Movable From Hood

In some embodiments, the storage member may be configured to be detachably or movably attached to the hood. The storage member may be moved by a user. The storage member may be detached or separated from the hood. The storage member may be lowered or moved while still being connected to the hood via a connecting member. This allows the user to take and use an item stored in the storage member.

The storage member may be a container to contain items therein. The storage member may be affixed to the front hood with attachment parts such as bolts and clips. Examples of the clips include a trim clip, an anchor clip, and the like. In order to prevent the storage member from falling off from the hood, such attachment parts are required to have a certain strength.

In some embodiments, the storage member is configured not to fall off from the hood while the hood is closed, and yet to be detachable or movable when the hood is open. For example, an affixing mechanism (e.g., an affixing key or pin) is provided to affix the storage member or avoid the storage member from moving while the engine or the motor is on. For example, the affixing key or pin moves into the storage member to tightly hold the storage member. For example, the affixing key or pin may be pulled out to allow the storage member to move.

In some embodiments, a part or the entirety of the storage member may be configured to be completely detachable from the hood or the vehicle. The user can then take the detached storage member by hand.

In some embodiments, the storage member may be at least partially detached from the hood, but not be connected to the hood at another part, via a connecting member. Examples of the connecting member include, but are not limited to, a fall-off prevention mechanism, a hinge, a slide, a damper, a pantograph, a rope, a wire, and the like.

In some embodiments, a fall-off prevention tool is provided to prevent the storage member from falling off when the storage member is detached or moved from the hood. The storage member can fall off due to various reasons. The storage member may fall off from the hood while the hood is closed due to vibration or shock. It can damage the storage member, the items inside of it, and any item or structure in the space under the front hood (a frunk, an engine compartment, etc.). The storage member may fall off from the hood while the front hood is open due to improper use by the driver or a user. The storage member may fall off from the hood because of a defect in the attachment tools, e.g., bolts and clips, that fix the storage member to the hood. These are merely examples, and the storage member may fall off due to other reasons. The fall-off prevention tool can catch the storage member which is detached from the hood and started to fall off. Thus, the fall off prevention tool can catch the storage member and prevent the storage member from completely falling in the frunk or the engine compartment, or on a user, and hitting parts or the structure therein or thereof, or a person.

Embodiment 3: Descending Mechanism

In some embodiments, the storage member is configured to descend or move downwards from the hood when the hood is open or lifted.

Descending Mechanisms

In some embodiments, the hood assembly or the vehicle may have a descending mechanism (which may also be referred to as "pulldown mechanism") for the storage member. For example, such a descending mechanism may allow the storage member to descend or move downward from the hood when the hood is open or lifted.

Examples of such a descending mechanism include, but are not limited to, a hinge mechanism, a pantograph mechanism (e.g., rhombus pantograph and single-arm pantograph), a slide mechanism, and other mechanisms, and a combination of two or more thereof.

Hinge Mechanism

In some embodiments, the descending mechanism may include or be a hinge. The hinge may hingeably connect the storage member and the hood. The hinge may rotate to cause the storage member to descend. The hinge may be a positioning hinge, which can hold the objects connected thereto in place at a certain angle. The hinge may be a torque hinge or a friction hinge, which an apply friction or to resistance to the motion thereof and allows to stop at any angle at which the user wants to maintain the objects connected thereto.

Pantograph Mechanism

In some embodiments, the descending mechanism may include or be a pantograph mechanism. The pantograph mechanism may movably connect the storage member and the hood. The pantograph mechanism may be a single-arm pantograph or may be a rhombus pantograph.

Slide Mechanism

In some embodiments, the descending mechanism may include or be a slide mechanism. The slide mechanism may movably connect the storage member and the hood. The slide mechanism may allow the storage member to linearly move with respect to the hood.

Other Mechanisms

In some embodiments the descending mechanism is configured to hold the storage member horizontally at a descended position. In some embodiments, the descending mechanism is configured to hold the storage member tilted, or at an angle, at a descended position. In some embodiments, the descending mechanism is configured to hold the storage member at different angles. The angle may be set or controlled by the user.

In some embodiments, a descending mechanism may be configured to hold the storage member at the lower surface of the hood when the hood is closed, and allow the storage member to move (descend) when the hood is open, or to descend from the lower surface of the hood when the front hood is open.

The descending mechanism may have a damper or a shock absorber to allow the storage member to slowly descend or to control the speed of the storage member.

In some embodiments, the descending mechanism may have a motor to control the movement of the storage member. The motor may be arranged in the descending mechanism, in or at the hood, in the storage member, or in a vehicle. Multiples motors may be arranged at multiple positions. The motor may be activated when the hood should open, such as at the timing when the latch or a switch is operated by the driver or a user. The motor may control the movement of the storage member with respect to the hood. The storage member may descend or ascend by action of the motor. The motor may be controlled in such a way that the storage member stops its movement when it feels an unexpected load. Such control may enable a safety-stop function of the storage member.

In some embodiments, the descending mechanism may be spring-loaded. For example, but not in a limiting manner, a hinge, a pantograph, a slide bar or the like which connects the hood and the storage member may be spring-loaded. For example, the hinge may be spring-loaded.

The hinge may have a motor built inside to control the movement of the hinge or the angle of the hinge. Such mechanism may enable a slow descent and/or an easy lifting of the storage member.

The descending mechanism may include, but is not limited to, an electric motor, a combination of hydraulic pump and a motor, a scissor lift, and an air shock (also referred to as a hood strut or glovebox).

The descending mechanism may include multiple mechanisms. For example, the storage member may be connected to the hood via a combination of a hinge and a damper.

In some embodiments, the descending mechanism is configured to allow the storage member to move in multiple directions. For example, the descending mechanism may include a hinge and a slide mechanism. For example, a hinge rotates and allows the storage member to descend, and a slide may allow the storage member to move linearly, for example horizontally. For example, a pantograph, a pantograph, or both allows the storage member to descend, and another slide may allow the storage member to move horizontally.

Control of Storage Member

In some embodiments, the movement of the storage member may be manually controlled by the user. In some embodiments, the movement of the storage member may be automatically controlled. Such an automatic control may include a sequence of: upon an order or input to open or unlock the hood by a user, lifting the hood; causing the storage member to descend as or after the hood ascends or moves up; when the hood is completely up, holding the storage member horizontally; and upon an order or input to close or shut the hood by a user, returning the storage member to a position against the hood.

Upper and Lower Sides of Storage Member

The storage member may have an upper side or surface and a lower side or a surface. As used herein the "upper side" of the storage member refers to a side that faces the lower surface of the hood. As used herein the "lower side" of the storage member refers to a side that faces the bottom of the trunk volume.

In some embodiments, the items may be stored on the lower side of the storage member. The user may reach for and take the items from below. The storage member may descend to come closer to the user. This allows the user to easily reach the item that the user wishes to use.

In some embodiments, the items may be stored on the upper side of the storage member. The storage member may be configured such that the items are accessible from the upper side of the storage member when the storage member has descended.

Cover

In some embodiments, the storage member may have a cover to cover the upper side of the storage member and/or to protect the items.

Container

In some embodiments, the storage member may have one or more containers. Such a container can be opened to then allow the user to access the items stored in the container.

Drawer

In some embodiments, the storage member may have one or more drawers. Such a drawer may be pulled out to a side of the vehicle, for example to the front side, the rear side, the right side, or the left side of the vehicle. The drawers may be built in a fixed storage member or in a moveable storage member.

In some embodiments, drawers may be built in a storage member that can descend. In some embodiments, such a drawer may be configured to be pulled to a side of the vehicle when the storage member has descended. The drawer may be pulled out horizontally.

Box

In some embodiments, the storage member may have one or more boxes. Such a box may store items therein. The individual box may be taken from the storage member to be carried by a user.

Hood Lift Assist

In some embodiments, the hood assembly or the vehicle may have a hood lift assist mechanism to lift the hood. In some examples, the hood assembly may have a hinge which has a torque motor.

In some embodiments, the hood may be opened manually. The hood may be opened when the vehicle is unlocked by a user. The hood may be opened when the lever to unlock the hood is pulled. The hood may be lifted by hand. The hood may have a support rod or dampers to hold it up.

In some embodiments, the hood may be opened remotely. A key or a key fob of the vehicle may have a hood-lift button to send the signal to the vehicle to open the hood when pushed. The user may open the hood via a smartphone app. A proximity sensor may be built in the vehicle to detect a chip card, a smartphone or the like carried by a user. When the proximity sensor detects the user, it may unlock and lift the hood.

Heater

In some embodiments, the hood assembly or the vehicle may have a heating device, a heater, or a heating mechanism. The heating device may be used to melt snow or ice on the hood or when the hood is frozen. It allows the hood to be easily opened. The heating device may be embedded in the hood latch (latch heater). For example, a coil heater or a band-clamp heater may surround a bracket that attaches the latch to the vehicle. For example, a latch radiator heater may be used.

In some embodiments, the heating device may include a heating wire. The heating wire may be formed as a sheet. The heating wire or the sheet including a heating wire may be attached to the inner surface of the hood.

The heating device may be disposed on top of the front hood, underneath the front hood, between the front hood and the storage member, or at, on, or in the storage member.

The heating device may be a blower disposed in the vehicle. The blower may be configured to send heated air to the hood. The blower may be arranged in the vicinity of a battery. The battery may be in an electric vehicle. Hot or warm air may warm the battery. The blower may thereby warm the battery. The blower may be powered by the battery, causing the battery to warm itself. Thus, use of such a blower arranged near a battery and powered by the battery can warm the battery from the inside and from the outside, and the hood.

BRIEF DESCRIPTION OF THE DRAWINGS

Some embodiments and examples of the present disclosure will now be discussed in detail by referring to the following figures. The embodiments and examples, with reference to the accompanying drawings, are given as examples only, and they should not be interpreted as being limiting.

EXAMPLE 1

Figure 1:
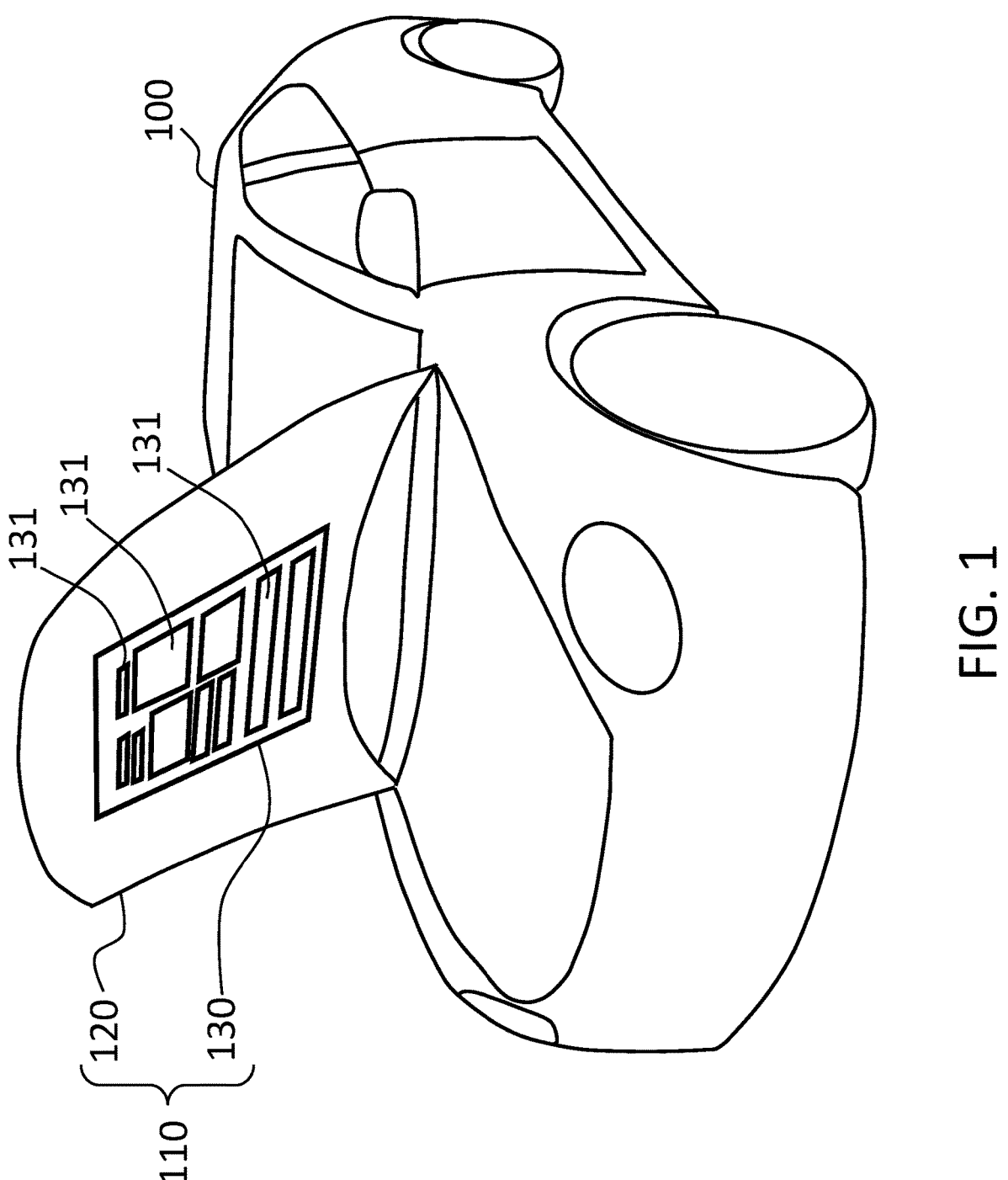
FIG. 1 shows a vehicle having a front hood assembly according to an example.

FIG. 1 shows a vehicle 100 having a front hood assembly 110 according to an example. The front hood assembly 110 includes a front hood 120 and a storage member 130 that is fixed to the lower surface of the front hood 120.

The storage member 130 has multiple item holders 131 on its surface to hold corresponding items (not shown). The user has access to the items held by the items holders 131 from below when the front hood 120 is lifted.

EXAMPLE 2

Figure 2:
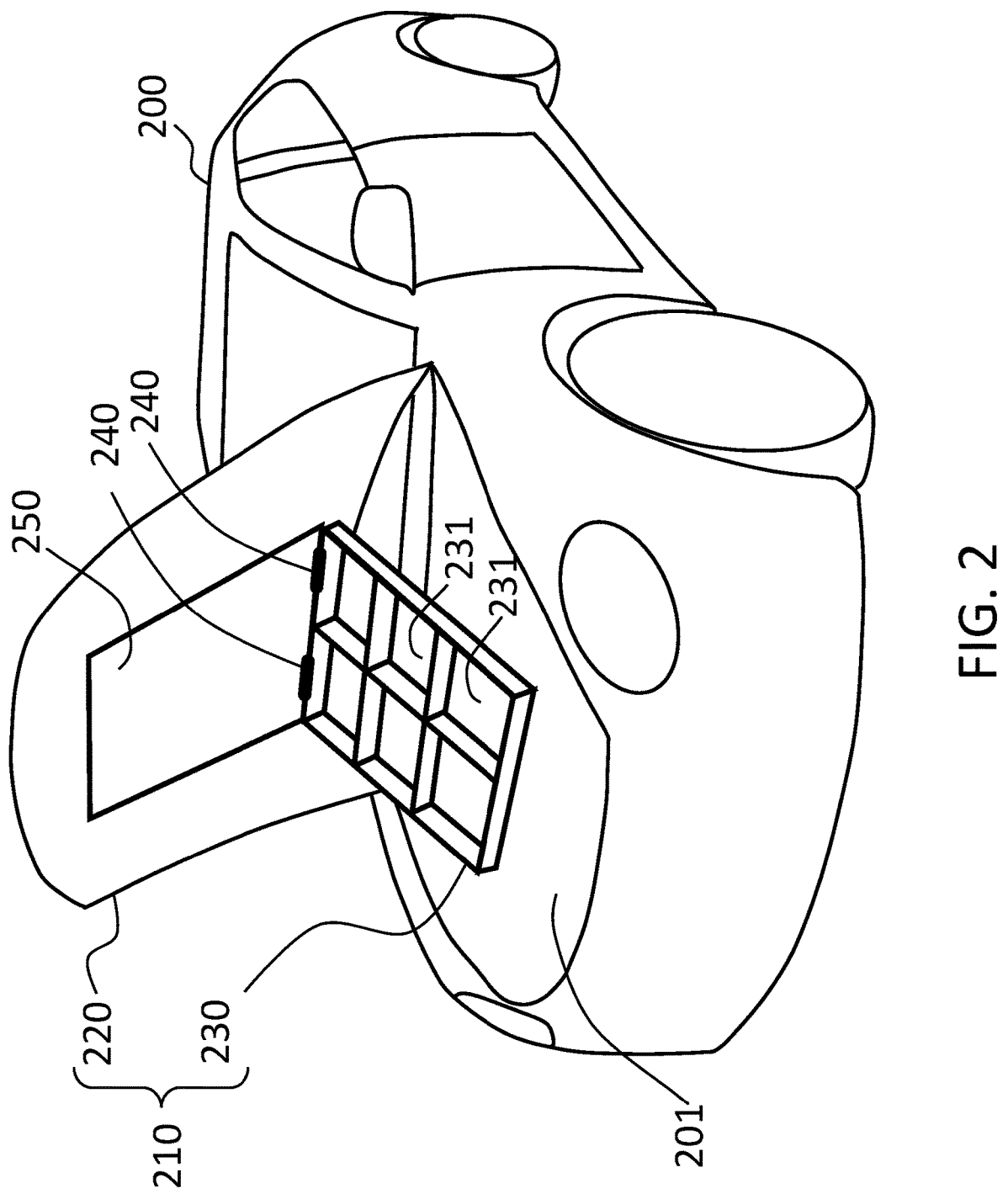
FIG. 2 shows a vehicle having a front hood assembly according to an example.

FIG. 2 shows a vehicle 200 having a front hood assembly 210 according to an example. The front hood assembly 210 includes a front hood 220 and a storage member 230 that is attached to the lower surface of the front hood 220 at one edge.

The storage member 230 is connected to the surface of the front hood 220 at one edge, via hinges 240. The hinges 240 hingeably connect the hood 220 and the storage member 230. The storage member 230 can thereby rotate and descend from the hood 220 in the lifted position.

The storage member 230 has multiple storage sections 231 which are configured to store the corresponding items (not shown).

In this example, the storage member 230 can descend into the frunk volume 201. This allows the user to access items easily, for example. Also, if a user drops an item by mistake, the item will fall into the frunk 201 and will not fall out of the vehicle 200 onto the ground, for example.

A top member 250 is arranged on the area of the lower surface of the front hood 220 so as to correspond to the upper surface of the storage member 230 when the storage member 230 is lifted up to the hood 220. The top member 250 can serve as a cover to cover the storage member 230 while the hood 220 is closed. This can prevent items in the storage member 230 from popping out therefrom due to vibration.

EXAMPLE 3

Figure 3:
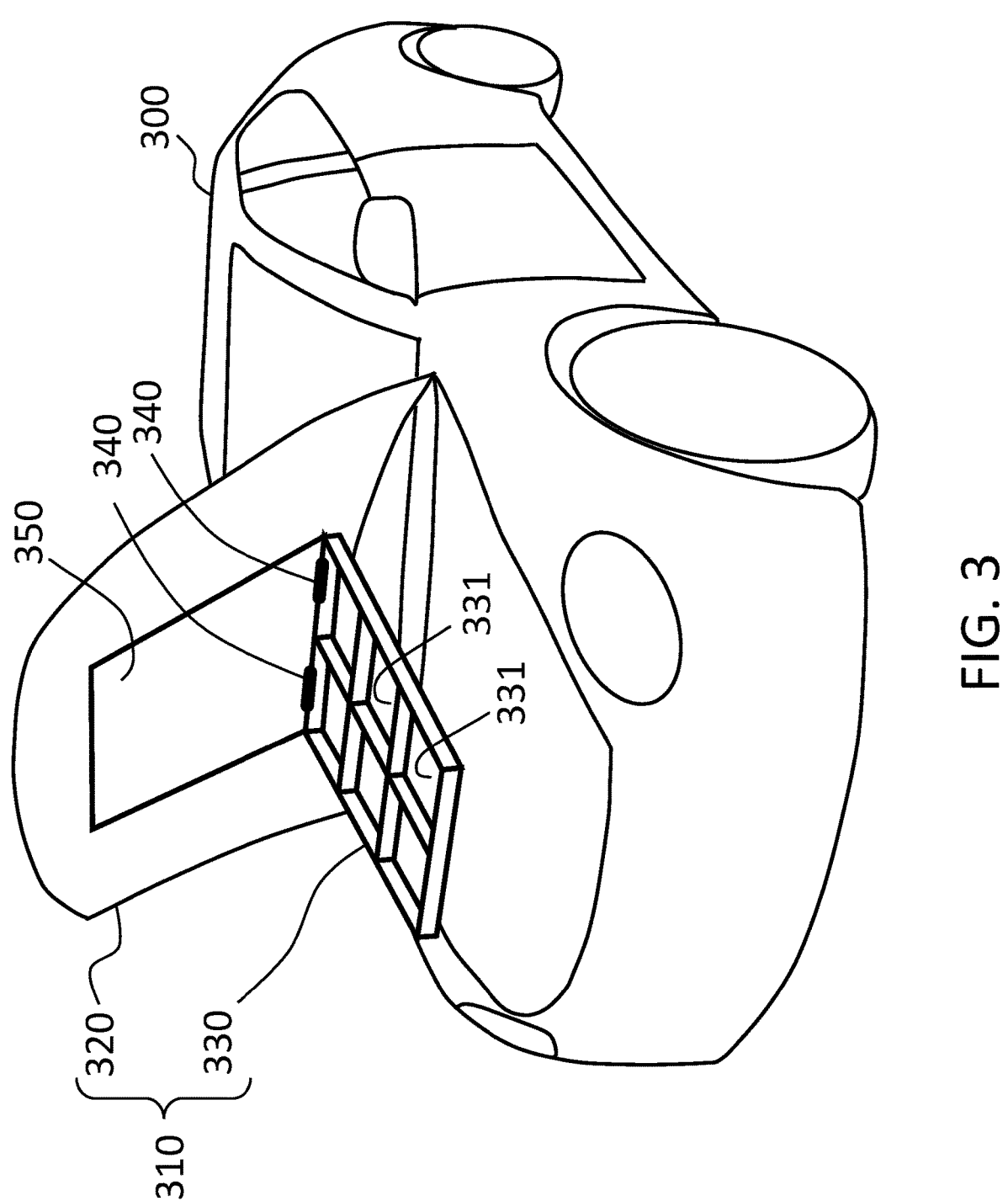
FIG. 3 shows a vehicle having a front hood assembly according to an example.

FIG. 3 shows a vehicle 300 having a front hood assembly 310 according to an example. The front hood assembly 310 includes a front hood 320 and a storage member 330 that is attached to the lower surface of the front hood 320 at one edge.

The storage member 330 is connected to the lower surface of the front hood 320 at one edge, via hinges 340. The hinges 340 hingeably connect the hood 320 and the storage member 330. The storage member 330 in the lifted position can thereby rotate and descend from the hood 320.

The storage member 330 has multiple storage sections 331 which are configured to store the corresponding items (not shown).

In this example, the storage member 330 can descend while maintaining a horizontal orientation. This allows the items to be held in a secure position. In other words, it can prevent the items from slipping or moving in the storage member 330.

A top member 350 is arranged on the area of the lower surface of the front hood 320 so as to correspond to the upper surface of the storage member 330 when the storage member 330 is lifted up to the hood 320. The top member 350 can serve as a cover to cover the storage member 330 while the hood 320 is closed. This can prevent the items in the storage member 330 from popping out therefrom due to vibration.

EXAMPLE 4

Figure 4:
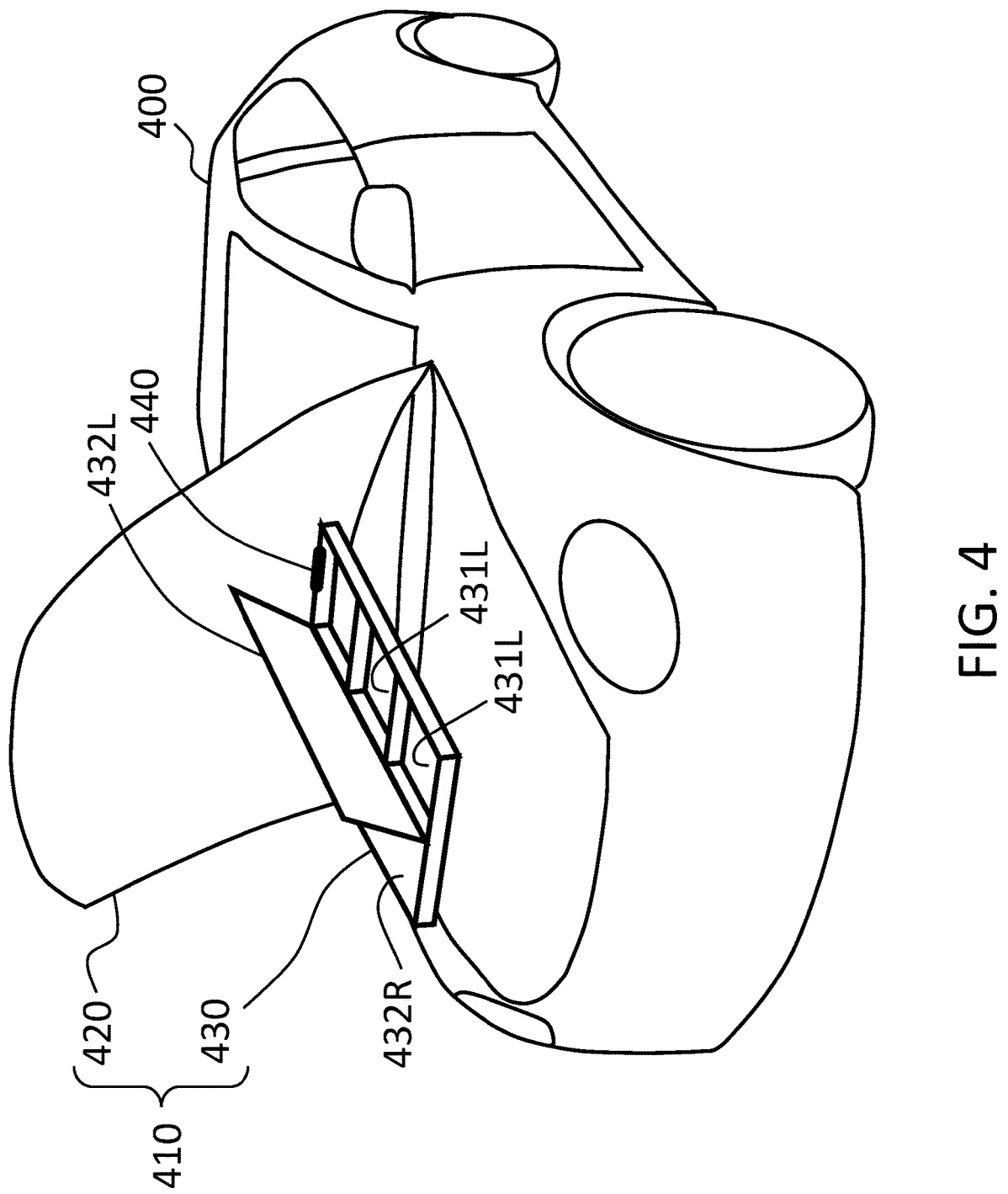
FIG. 4 shows a vehicle having a front hood assembly according to an example.

FIG. 4 shows a vehicle 400 having a front hood assembly 410 according to an example. The front hood assembly 410 includes a front hood 420 and a storage member 430 that is attached to the lower surface of the front hood 420 at one edge.

The storage member 430 is connected via hinges 440 to the lower surface of the front hood 420 at one edge. The hinges 440 hingeably connect the hood 420 and the storage member 430. The storage member 430 can thereby rotate and descend from the hood 420 in the lifted position.

The storage member 430 has multiple storage sections 431 which are configured to store the corresponding items (not shown).

In this example, the storage member 430 has a cover or lid 432 to cover the upper surface of the storage member 430 to protect the items or avoid items popping out of the storage member 430.

In some embodiments, multiple covers 432 may be provided. As illustrated in FIG. 4, two covers may be provided, one for the left side of the storage member 430 (cover 432L), and the other for the right side of the storage member 430 (cover 432R), to cover the left storage sections 431L and the right storage sections 432R (not shown), respectively.

EXAMPLE 5

Figure 5:
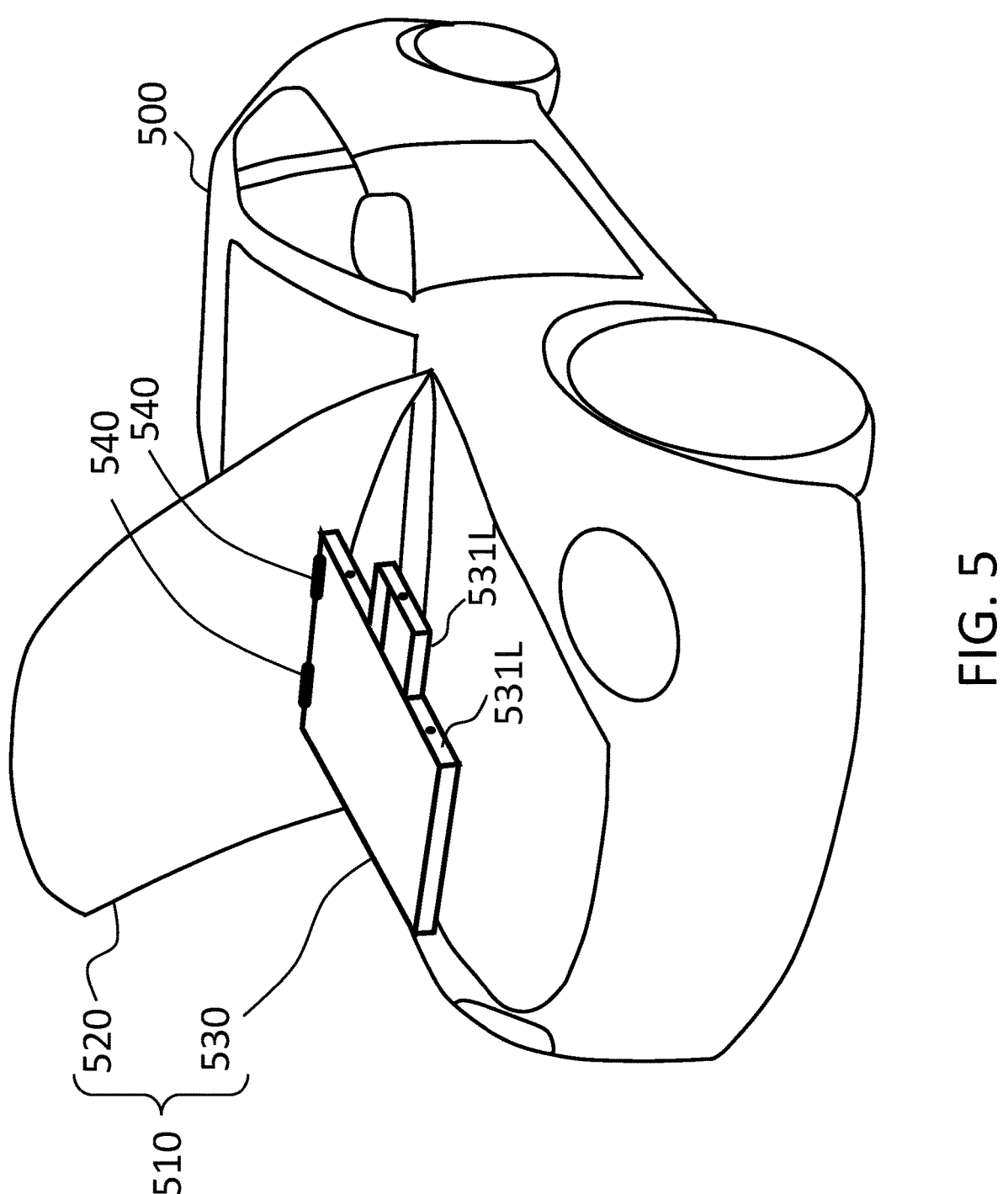
FIG. 5 shows a vehicle having a front hood assembly according to an example.

FIG. 5 shows a vehicle 500 having a front hood assembly 510 according to an example. The front hood assembly 510 includes a front hood 520 and a storage member 530 that is attached to the lower surface of the front hood 520 at one edge.

The storage member 530 is connected via hinges 540 to the lower surface of the front hood 520 at one edge. The hinges 540 hingeably connect the hood 520 and the storage member 530. The storage member 530 in the lifted position can thereby rotate and descend from the hood 520.

In this example, the storage member 530 has a drawer 531 which can be pulled out to a side of the storage member 530. In some embodiments, multiple drawers 531 may be provided. As illustrated in FIG. 5, left drawers 531L and right drawers 531R (not shown) are configured to be pulled out to the left side and the right side of the vehicle 500, respectively.

EXAMPLE 6

Figure 6:
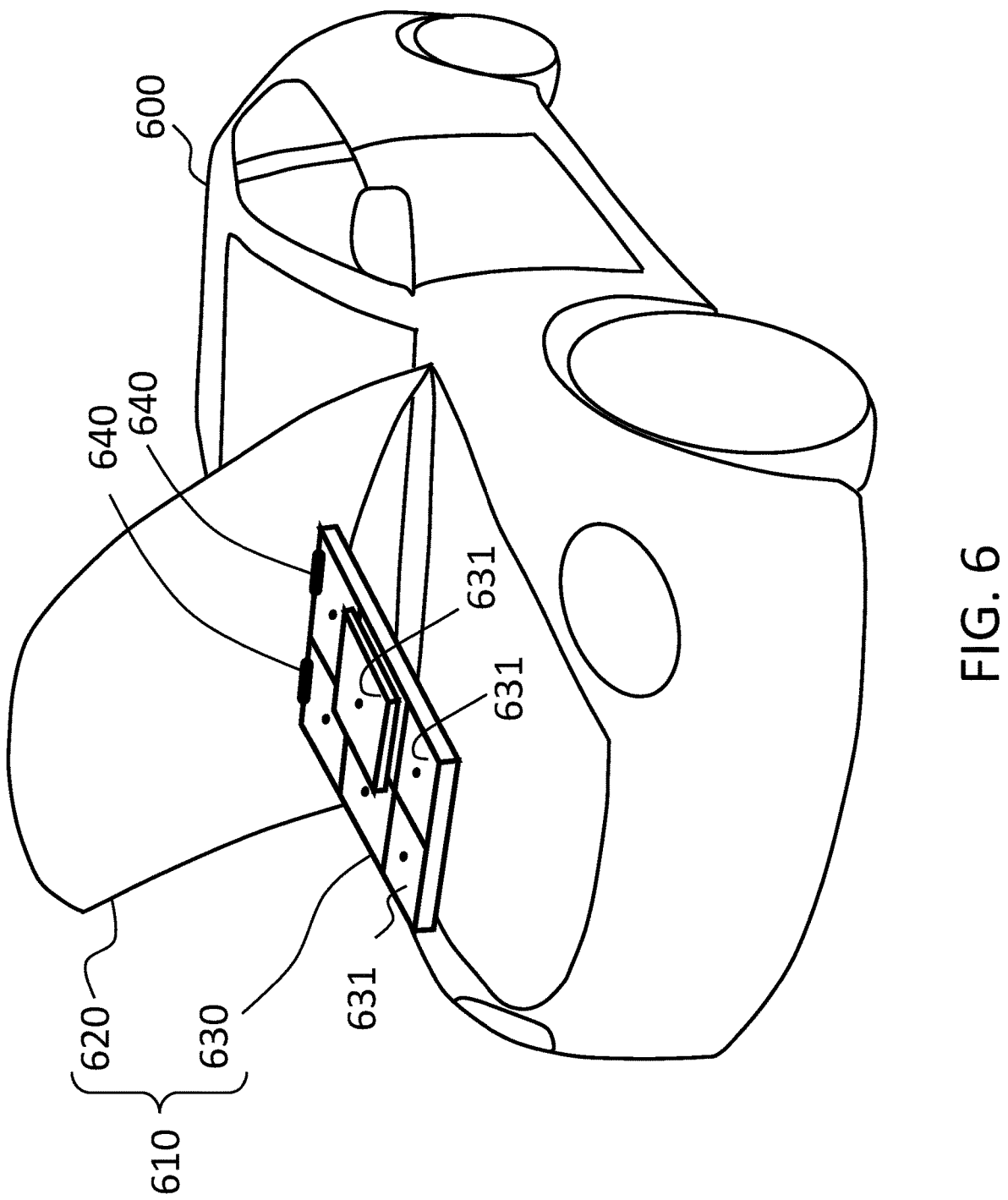
FIG. 6 shows a vehicle having a front hood assembly according to an example.

FIG. 6 shows a vehicle 600 having a front hood assembly 610 according to an example. The front hood assembly 610 includes a front hood 620 and a storage member 630 that is attached to the lower surface of the front hood 620 at one edge.

The storage member 630 is connected via hinges 640 to the lower surface of the front hood 620 at one edge. The hinges 640 hingeably connect the hood 620 and the storage member 630. The storage member 630 can thereby rotate and descend from the hood 620 in the lifted position.

In this example, the storage member 630 has a box 631 which can be taken out of the storage member 630. In some embodiments, multiple boxes 631 may be provided. Each box 631 can store one or more corresponding items.

EXAMPLE 7

Figure 7:
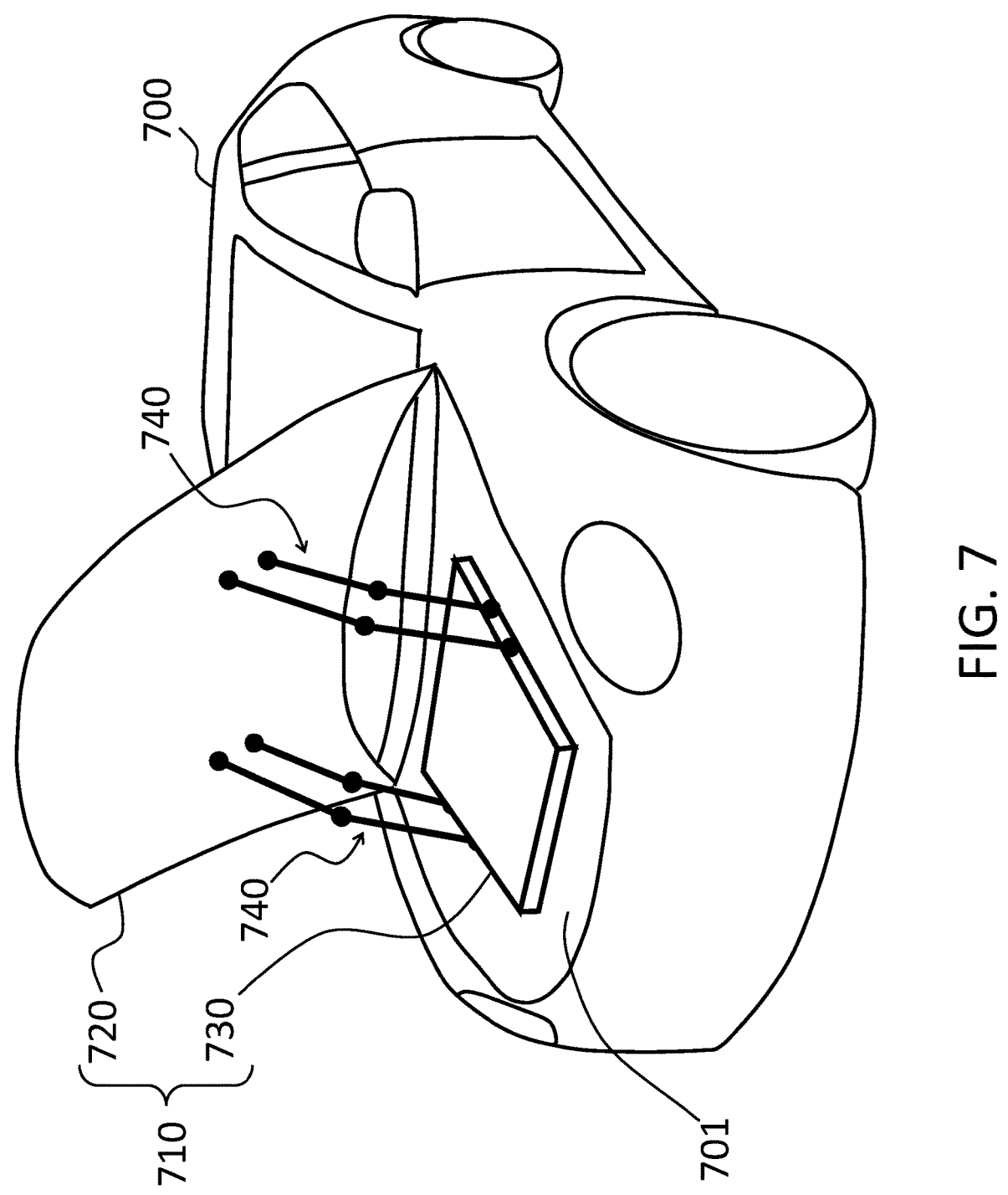
FIG. 7 shows a vehicle having a front hood assembly according to an example.

FIG. 7 illustrates a vehicle 700 having a front hood assembly 710 according to an example. The front hood assembly 710 includes a front hood 720 and a storage member 730 that is attached to the lower surface of the front hood 720.

The storage member 730 is connected via one or more pantographs 740 to the lower surface of the front hood 720. As illustrated in FIG. 7, a single-arm pantograph may be used in some embodiments. In some embodiments, a rhombus pantograph may be used. The storage member 730 in the lifted position can thereby descend from the hood 720.

With hinges as illustrated in FIGS. 2 to 6, the movement of or the descended position of the storage members 230 to 630 is limited by the hinges. The pantographs 740 allow the storage member 730 to move even below the lowest part of the upper member 740 or even into the frunk 701. The descended position of the storage member 730 may be horizontal or be inclined. The height of the storage member 730 at the descended position may be adjusted, tuned, or regulated in a fine manner.

Other Mechanisms

Other connecting mechanisms between the hood and the storage member may be adopted. For example, a slide mechanism can be used. For example, a combination of two or more of a hinge mechanism, a pantograph mechanism, a slide mechanism, and other mechanisms may be adopted.

In FIGS. 2 and 3, the upper members 250 and 350 are provided. Such upper members 250 and 350 may be fixed to the lower surface of the hood 220 and hood 320. In some embodiments, such an upper member can contain a noise-damping material to prevent the items held in the storage member from falling. In some embodiments other than those shown in FIGS. 2 and 3, upper members and/or noise-damping materials may be arranged at the lower surface of the hood, between the lower surface of the hood and the storage member, or in the cover of the storage member.

The present disclosure also provides the following embodiments:

A001. A (front) hood assembly for a vehicle, comprising:
a (front) hood; and
a storage member attached to a lower/inner surface of the (front) hood, and configured to store an item therein.

A011. The (front) hood assembly according to A001, or any one of the embodiments, wherein the storage member is fixed to the (front) hood.

A012. The (front) hood assembly according to A001 or A011, or any one of the embodiments, wherein the storage member comprises an item holder fixed to the (front) hood.

A013. The (front) hood assembly according to A012, or any one of the embodiments, wherein the item holder includes a plurality of item holders.

A015. The (front) hood assembly according to any one of A011 to A013, or any one of the embodiments, wherein the storage member has a cover to protect the items stored in the storage member.

A021. The (front) hood assembly according to A001, or any one of the embodiments, wherein the storage member is detachably or movably attached to the (front) hood.

A022. The (front) hood assembly according to A021, or any one of the embodiments, wherein the storage member is attached to the (front) hood with a bolt or a clip.

A023. The (front) hood assembly according to A021 or A022, or any one of the embodiments, further comprising a fall off prevention tool configured to prevent the storage member from falling when the storage member is detached from the (front) hood.

A031. The (front) hood assembly according to A001, or any one of the embodiments, wherein the storage member is configured to:
be placed at the lower surface of the (front) hood when the (front) hood is closed, and
be movable (descend) when the (front) hood is open (descend from the lower surface of the (front) hood when the (front) hood is open).

A032. The (front) hood assembly according to A001, or any one of the embodiments, further comprising a descending mechanism configured to:
hold the storage member at the lower surface of the (front) hood when the (front) hood is closed, and
allow the storage member to move (descend) when the (front) hood is open (descend from the lower surface of the (front) hood when the (front) hood is open).

A033. The (front) hood assembly according to A032, or any one of the embodiments, wherein the descending mechanism comprises a hinge hingeably connecting the storage member and the (front) hood.

A034. The (front) hood assembly according to A031, or any one of the embodiments, wherein the descending mechanism comprises a pantograph mechanism movably connecting the storage member and the (front) hood.

A035. The (front) hood assembly according to A031, or any one of the embodiments, wherein the descending mechanism comprises a slide mechanism movably connecting the storage member and the (front) hood.

A041. The (front) hood assembly according to any one of A031 to A035, or any one of the embodiments, wherein the storage member has an upper side which faces the lower surface of the (front) hood, the storage member being configured to store the item on or in an upper side thereof.

A042. The (front) hood assembly according to A041, or any one of the embodiments, wherein the storage member is configured such that the item is accessible from the upper side of the storage member when the storage member is at a descended position.

A043. The (front) hood assembly according to A041 or A042, or any one of the embodiments, wherein the storage member includes a cover the upper side thereof (to protect the item.)

A044. The (front) hood assembly according to A041 or A042, or any one of the embodiments, wherein the storage member includes a container which can be opened to allow access to the item stored in the container.

A051. The (front) hood assembly according to any one of A031 to A035, or any one of the embodiments, wherein the storage member has a drawer configured to:
be pulled out to a side of the vehicle or horizontally when the storage member is at a descended position, and
store the item therein.

A052. The (front) hood assembly according to A051, or any one of the embodiments, wherein the drawer comprises a plurality of drawers.

A053. The (front) hood assembly according to A051, or any one of the embodiments, wherein the drawer comprises at least one of:
a right drawer to be pulled out to a right side of the vehicle;
a left drawer to be pulled out to a left side of the vehicle; and
a (front) drawer to be pulled out to a (front) side of the vehicle.

A061. The (front) hood assembly according to A001, or any one of the embodiments, wherein the (front) hood is lifted by a hood lift assist mechanism.

A062. The (front) hood assembly according to A033, or any one of the embodiments, wherein the hinge includes a torque motor.

A071. The (front) hood assembly according to A001, or any one of the embodiments, further comprising a heating device.

B001. A vehicle comprising the (front) hood assembly according to any one of A001 to A071, or any one of the embodiments.

B002. A vehicle comprising a (front) hood assembly, the (front) hood assembly comprising:
a (front) hood; and
a storage member attached to a lower/inner surface of the (front) hood, and configured to store an item therein.

B071. The vehicle according to B001 or B002 or any one of embodiments, further comprising a heating device to heat the (front) hood.

Terms and phrases used in this application, and variations thereof, especially in the appended claims, unless otherwise expressly stated, should be construed as being open-ended rather than being closed. As examples of the foregoing, the term 'including' should be understood to mean 'including, without limitation,' 'including but not limited to,' or the like; the term 'comprising' as used herein is synonymous with 'including,' 'containing,' or 'characterized by,' and is inclusive or open-ended and does not exclude additional, unrecited elements or method steps; the term 'having' should be interpreted as 'having at least;' the term 'includes' should be interpreted as 'includes, but is not limited to;' the term 'example' is used to provide exemplary instances of the item in discussion, not an exhaustive or limiting list thereof.

A group of items linked with the conjunction 'and' should not be read as requiring that each and every one of these items be present in the grouping, but rather should be understood as 'and/or' unless expressly stated otherwise. Similarly, a group of items linked with the conjunction 'or' should not be understood as requiring mutual exclusivity among that group, but rather should be understood as 'and/or' unless expressly stated otherwise.

With respect to the use of substantially any plural or singular term herein in the English language, those skilled in the art can understand the plural and the singular as appropriate according to context and the use. The various singular and plural permutations may be expressly set forth herein for the sake of clarity. The indefinite article "a" or "an" does not exclude a plurality.

Any of the embodiments or any of the aspects disclosed herein is independently combinable, in part or in whole, with other embodiments described herein in any way, e.g., one, two, or three or more embodiments may be combinable in whole or in part. Furthermore, any of the features of any of the embodiments or any of the aspects disclosed herein is applicable to any of the other embodiments and aspects, or may be made optional for other embodiments or aspects.

While preferred embodiments of the present invention have been shown and described herein, it will be obvious to those skilled in the art that such embodiments are provided by way of example only. It is not intended that the invention be limited to the specific examples provided within the specification. While the invention has been described with reference to the aforementioned specification, the descriptions and illustrations of the embodiments and examples herein are not meant to be construed in a limiting sense. Numerous variations, changes, and substitutions can be conceived by those skilled in the art without departing from the concept of the invention. Furthermore, it shall be understood that no aspects of the invention are limited to the specific depictions, configurations, or relative proportions set forth herein which depend upon a variety of conditions and variables. It should be understood that various alternatives to the embodiments of the invention described herein may be employed in practicing the invention. It is therefore to be understood that the invention shall also cover any such alternatives, modifications, variations or equivalents. It is intended that the following claims define the scope of the invention and that methods and structures within the scope of these claims and their equivalents be covered thereby.

What is claimed is:

1. A front hood assembly for a vehicle, comprising:
a front hood; and
a storage member attached to a lower surface of the front hood, and configured to store an item therein,
wherein the storage member is configured to be placed at the lower surface of the front hood when the front hood is closed, and be movable to descend when the front hood is open,
wherein the storage member has an upper side which faces the lower surface of the front hood, the storage member being configured to store the item on or in the upper side thereof,
wherein the storage member is configured such that the item is accessible from the upper side of the storage member when the storage member has descended,
wherein the front hood assembly further comprises a motor configured to control movement of the storage member with respect to the front hood such that the storage member descends or ascends, and wherein the motor is controlled to stop the movement of the storage member when an unexpected load is applied to the storage member.

2. The front hood assembly according to claim 1, wherein the storage member comprises an item holder fixed to the front hood.

3. The front hood assembly according to claim 1, wherein the storage member is detachably attached to the front hood.

4. The front hood assembly according to claim 1, further comprising a descending mechanism configured to:

hold the storage member against the lower surface of the front hood when the front hood is closed, and allow the storage member to descend when the front hood is open.

5. The front hood assembly according to claim 4, wherein the descending mechanism comprises a hinge hingeably connecting the storage member and the front hood.

6. The front hood assembly according to claim 4, wherein the descending mechanism comprises a pantograph mechanism movably connecting the storage member and the front hood.

7. The front hood assembly according to claim 1, wherein the storage member includes a cover to cover the upper side thereof.

8. The front hood assembly according to claim 4, wherein the storage member includes a container which can be opened to allow access to the item stored in the container.

9. The front hood assembly according to claim 4, wherein the storage member has a drawer configured to:

be pulled out to a side of the vehicle or horizontally when the storage member is at a descended position, and store an item therein.

10. The front hood assembly according to claim 9, wherein the drawer comprises at least one of:

a right drawer to be pulled out to a right side of the vehicle;

a left drawer to be pulled out to a left side of the vehicle; and a front drawer to be pulled out to a front side of the vehicle.

11. The front hood assembly according to claim 1, further comprising a heating device.

12. A vehicle comprising a front hood assembly, the front hood assembly comprising:

a front hood; and a storage member attached to a lower/inner surface of the front hood, the storage member configured to store an item therein, wherein the storage member is configured to be placed at the lower surface of the front hood when the front hood is closed, and be movable to descend when the front hood is open, wherein the storage member has an upper side which faces the lower surface of the front hood, the storage member being configured to store the item on or in the upper side thereof, wherein the storage member is configured such that the item is accessible from the upper side of the storage member when the storage member has descended, wherein the front hood assembly further comprises a motor configured to control movement of the storage member with respect to the front hood such that the storage member descends or ascends, and wherein the motor is controlled to stop the movement of the storage member when an unexpected load is applied to the storage member.

13. The vehicle according to claim 12, further comprising a heating device to heat the front hood.

14. The front hood assembly according to claim 1, further comprising a descending mechanism configured to hold the storage member at the lower surface of the front hood when the front hood is closed, and allow the storage member to descend when the front hood is open.

* * * * *